(12) United States Patent
Liao (10) Patent No.: US 7,707,765 B2
(45) Date of Patent: May 4, 2010

(54) FISHING ROD FIXING DEVICE

(75) Inventor: Po Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 433 days.

(21) Appl. No.: 11/727,102

(22) Filed: Mar. 23, 2007

(65) Prior Publication Data

US 2008/0229647 A1    Sep. 25, 2008

(51) Int. Cl.
*A01K 97/10* (2006.01)
(52) U.S. Cl. .......................... 43/21.2; 248/512; 248/513; 248/515; 248/523; 248/524; 248/534; 248/537; 224/922; 224/321; 224/323; 224/324; 224/325; 224/559; 269/37; 269/71
(58) Field of Classification Search ............... 43/21.2; 248/511–515, 519, 520, 523, 524, 534, 537, 248/540; 224/922, 309, 310, 321–326, 555, 224/559; 269/37, 55, 71, 289 R, 309
See application file for complete search history.

(56) References Cited

U.S. PATENT DOCUMENTS

| | | | | |
|---|---|---|---|---|
| 122,370 A * | 1/1872 | Doolittle | ...................... | 248/515 |
| 159,795 A * | 2/1875 | Clarke | ...................... | 248/514 |
| 278,973 A * | 6/1883 | Kizer | ...................... | 248/514 |
| 373,362 A * | 11/1887 | Hamilton | ...................... | 269/71 |
| 450,474 A * | 4/1891 | Parker | ...................... | 269/71 |
| 456,891 A * | 7/1891 | Fish | ...................... | 269/71 |
| 459,637 A * | 9/1891 | Lee | ...................... | 269/71 |
| 546,421 A * | 9/1895 | Duke | ...................... | 269/71 |
| 706,531 A * | 8/1902 | Couch et al. | ................. | 269/71 |
| 1,013,711 A * | 1/1912 | Wiggins | ...................... | 269/71 |
| 1,025,657 A * | 5/1912 | Towne | ...................... | 43/21.2 |
| 1,084,130 A * | 1/1914 | Cargin | ...................... | 269/71 |
| 1,459,438 A * | 6/1923 | Brand | ...................... | 43/21.2 |
| 1,486,481 A * | 3/1924 | Cole | ...................... | 269/289 R |
| 1,615,889 A * | 2/1927 | Senn | ...................... | 269/55 |
| 1,670,253 A * | 5/1928 | Gilbert et al. | ................. | 269/71 |
| 1,719,695 A * | 7/1929 | Ferguson | ...................... | 43/21.2 |
| 2,106,525 A * | 1/1938 | Henry | ...................... | 269/71 |
| 2,171,053 A * | 8/1939 | White et al. | ................. | 224/922 |

(Continued)

FOREIGN PATENT DOCUMENTS

EP    1327387 A1 *    7/2003

(Continued)

*Primary Examiner*—Darren W Ark
(74) *Attorney, Agent, or Firm*—Muncy, Geissler, Olds & Lowe, PLLC (57) ABSTRACT

A fishing rod fixing device includes a base that is supported by two suction cups for easy and efficient attachment of the device to a smooth fixture surface. A seat is rotatably mounted on the base and is releasably set any desired horizontal direction by an adjustment knob. The seat includes a tubular bar on which at least one retainer is mounted and rotatable about the bar for setting the retainer at any desired inclination angle. An angle locking member is provided to releasably secure the retainer at the desired inclination angle. The retainer has a base support mounted to the tubular bar and a top wall member spaced from the base support to define a passage therebetween for receiving a fishing rod. A locking member is provided on the top wall and is manually movable to releasably and selectively secure the fishing rod to the base support.

6 Claims, 6 Drawing Sheets

U.S. PATENT DOCUMENTS

| | | | | |
|---|---|---|---|---|
| 2,173,953 A * | 9/1939 | Schwisow | 224/324 |
| 2,178,655 A * | 11/1939 | Strandt | 43/21.2 |
| 2,184,583 A * | 12/1939 | Danko | 43/21.2 |
| 2,228,593 A * | 1/1941 | Dibble et al. | 248/513 |
| 2,248,170 A * | 7/1941 | Hansen | 224/922 |
| 2,288,442 A * | 6/1942 | Felton | 224/922 |
| 2,302,300 A * | 11/1942 | Davies | 224/559 |
| 2,315,387 A * | 3/1943 | Bambenek et al. | 224/922 |
| 2,434,387 A * | 1/1948 | Brandt | 224/323 |
| 2,434,826 A * | 1/1948 | Wubben | 224/323 |
| 2,438,388 A * | 3/1948 | Dolk | 43/21.2 |
| 2,454,458 A * | 11/1948 | Kaetker | 248/514 |
| 2,502,684 A * | 4/1950 | Ward | 248/515 |
| 2,502,714 A * | 4/1950 | Garnett | 224/324 |
| 2,522,255 A * | 9/1950 | Climo | 43/21.2 |
| 2,553,231 A * | 5/1951 | Bayto | 248/534 |
| 2,554,650 A * | 5/1951 | Waite | 224/922 |
| 2,580,130 A * | 12/1951 | Rowdon | 43/21.2 |
| 2,602,617 A * | 7/1952 | Muth | 248/537 |
| 2,602,990 A * | 7/1952 | Ferguson | 269/71 |
| 2,607,398 A * | 8/1952 | Andrews | 248/513 |
| 2,645,439 A * | 7/1953 | Gauthier | 248/515 |
| 2,669,958 A * | 2/1954 | Sweeney | 269/71 |
| 2,734,555 A * | 2/1956 | Kroner | 248/528 |
| 2,764,331 A * | 9/1956 | Bigos | 224/922 |
| 2,773,303 A * | 12/1956 | Tirone | 269/71 |
| 2,827,690 A * | 3/1958 | Brown | 269/71 |
| 2,854,147 A * | 9/1958 | Derr | 248/513 |
| 2,908,460 A * | 10/1959 | Townsend et al. | 248/515 |
| 3,001,679 A * | 9/1961 | Canning et al. | 224/324 |
| 3,104,042 A * | 9/1963 | Gaus | 224/309 |
| 3,155,238 A * | 11/1964 | Bennett | 211/70.5 |
| 3,198,408 A * | 8/1965 | Benner | 269/309 |
| 3,220,624 A * | 11/1965 | Hodak | 224/323 |
| 3,246,865 A * | 4/1966 | Latimer | 43/21.2 |
| 3,484,066 A * | 12/1969 | Aunspaugh | 43/21.2 |
| 3,516,190 A * | 6/1970 | Cook | 43/21.2 |
| 3,783,547 A * | 1/1974 | Bystrom et al. | 43/21.2 |
| 3,792,805 A * | 2/1974 | Binding et al. | 224/323 |
| 3,897,922 A * | 8/1975 | Keen | 248/535 |
| 4,043,531 A * | 8/1977 | Green | 248/515 |
| 4,073,462 A * | 2/1978 | Whitaker | 248/537 |
| 4,157,803 A * | 6/1979 | Mack | 43/21.2 |
| 4,523,704 A * | 6/1985 | Washington | 224/922 |
| 4,551,939 A * | 11/1985 | Kitchens | 43/21.2 |
| 4,613,120 A * | 9/1986 | Kozar | 269/71 |
| 4,660,814 A * | 4/1987 | Shader et al. | 269/71 |
| 4,792,129 A * | 12/1988 | LePrevost, Jr. | 269/71 |
| 4,852,290 A * | 8/1989 | Wallace et al. | 43/21.2 |
| 4,932,152 A * | 6/1990 | Barlotta et al. | 43/21.2 |
| 5,014,458 A * | 5/1991 | Wagner | 43/21.2 |
| 5,054,737 A * | 10/1991 | DeLancey | 43/21.2 |
| 5,121,565 A * | 6/1992 | Wille et al. | 43/21.2 |
| 5,142,809 A * | 9/1992 | O'Brien et al. | 43/21.2 |
| 5,163,652 A * | 11/1992 | King | 43/21.2 |
| 5,222,707 A * | 6/1993 | Myers | 224/309 |
| 5,367,815 A * | 11/1994 | Liou | 43/21.2 |
| 5,383,589 A * | 1/1995 | Tracy et al. | 224/324 |
| 5,494,553 A * | 2/1996 | Colucci | 269/37 |
| 5,560,138 A * | 10/1996 | Dentsbier | 43/21.2 |
| 5,632,427 A * | 5/1997 | Gattuso et al. | 43/21.2 |
| 5,685,107 A * | 11/1997 | Sweet | 43/21.2 |
| 5,709,373 A * | 1/1998 | Wasylynko | 269/71 |
| 5,715,952 A * | 2/1998 | Chichetti | 224/922 |
| 5,820,119 A * | 10/1998 | Chacon, Sr. | 269/37 |
| 5,984,160 A * | 11/1999 | Santa Cruz et al. | 269/71 |
| 5,996,273 A * | 12/1999 | George | 43/54.1 |
| 6,386,786 B1 * | 5/2002 | Perlman et al. | 248/540 |
| 6,609,689 B1 * | 8/2003 | Knapp | 248/537 |
| 6,898,893 B1 * | 5/2005 | Mukdaprakorn | 43/21.2 |
| 6,908,138 B2 * | 6/2005 | Yang | 224/559 |
| 6,962,018 B1 * | 11/2005 | King | 43/21.2 |
| 7,047,688 B2 * | 5/2006 | Sandman, Jr. | 43/21.2 |
| 7,219,464 B1 * | 5/2007 | Kujawa | 43/21.2 |
| 7,254,915 B2 * | 8/2007 | Mrotek | 43/21.2 |
| 7,395,628 B2 * | 7/2008 | Rayfield | 43/21.2 |
| 7,406,795 B1 * | 8/2008 | Follmar | 43/21.2 |
| 7,472,510 B1 * | 1/2009 | Fasola | 43/21.2 |
| 7,503,540 B2 * | 3/2009 | Hood | 248/537 |
| 7,621,066 B1 * | 11/2009 | Mathison | 43/21.2 |
| 2008/0155881 A1 * | 7/2008 | Carnevali | 43/21.2 |
| 2009/0084019 A1 * | 4/2009 | Carnevali | 43/21.2 |

FOREIGN PATENT DOCUMENTS

| | | | |
|---|---|---|---|
| FR | 2786366 A1 * | 6/2000 |
| FR | 2844336 A1 * | 3/2004 |
| GB | 2188221 A * | 9/1987 |
| GB | 2200021 A * | 7/1988 |
| GB | 2232863 A * | 1/1991 |
| GB | 2313030 A * | 11/1997 |
| GB | 2318715 A * | 5/1998 |
| GB | 2376399 A * | 12/2002 |
| JP | 01273533 A * | 11/1989 |
| JP | 03198735 A * | 8/1991 |
| JP | 05153890 A * | 6/1993 |
| JP | 07289136 A * | 11/1995 |
| JP | 08196179 A * | 8/1996 |
| JP | 09252696 A * | 9/1997 |
| JP | 10327731 A * | 12/1998 |
| JP | 11169046 A * | 6/1999 |
| JP | 2000032897 A * | 2/2000 |
| JP | 2002176895 A * | 6/2002 |
| JP | 2004097135 A * | 4/2004 |
| JP | 2004290131 A * | 10/2004 |

\* cited by examiner

FISHING ROD FIXING DEVICE

BACKGROUND OF THE INVENTION

1. Field of the Invention

The present invention relates to a fishing rod fixing device, and in particular to a fishing rod fixing device that allows for adjustment of horizontal direction and vertical inclination angle of a fishing rod retained on the fishing rod fixing device.

2. The Related Arts

Sports fishing has been a popular outdoor activity over the whole world. Doing sport fishing requires a person to stay by for example a pond or a lake in a clam and patient manner. And, this allows the person to deeply relax himself or herself. However, fishing sometimes requires very long time waiting before a fish bites the bait and the fisher has to hold the fishing rod for such a long time. This often causes pain and strain of muscles, especially after whole day fishing. Thus, it is often that the fishing rod is fixed on the bank of a river or a pond for a long time waiting. Conventionally, a simple-structured rack is provided for positioning the fishing rod thereon. Or, the fishing rod is simply retained by large pebbles accessed at the river bank. All these are not convenient and effective for retaining a fishing rod.

Thus, it is desired to provide a fishing rod fixing device that provides easy, efficient and adjustable retention of a fishing rod so as to overcome the drawbacks of the conventional devices.

SUMMARY OF THE INVENTION

An object of the present invention is to provide a fishing rod fixing device that allows for easy, efficient, and adjustable retention of a fishing rod. The fishing rod fixing device in accordance with the present invention comprises a base that is supported by two suction cups for easy and efficient attachment of the device to a smooth fixture surface. A seat is rotatably mounted on the base and is releasably set any desired horizontal direction by an adjustment knob. The seat comprises a tubular bar on which at least one retainer is mounted and rotatable about the bar for setting the retainer at any desired inclination angle. An angle locking member is provided to releasably secure the retainer at the desired inclination angle. The retainer has a base support mounted to the tubular bar and a top wall member spaced from the base support to define a passage therebetween for receiving a fishing rod. A locking member is provided on the top wall and is manually movable to releasably and selectively secure the fishing rod to the base support.

The conventional fishing rod fixing device that is available in the market is either too simple or too complicated in structure and is difficult to operate or use. And, the fishing rod fixing device of the present invention has a simple and sufficiently efficient-to-operate structure. In addition, the fishing rod fixing device allows a plurality of fishing rods to be retained on the same fishing rod fixing device, while the conventional device allows only a very limited number of fishing rods to be retained by a single device.

Further, the conventional device does not provide easy and efficient adjustment of the direction and inclination angle of the fishing rod retained thereon. The fishing rod fixing device of the present invention, on the contrary, provides a very easy and efficient way for adjusting the horizontal direction and the inclination angle of the fishing rod fixed thereon.

In addition, the fishing rod fixing device employs suction cups to attach the device to a smooth fixture surface and this apparently simplifies the mounting process as compared to the conventional devices.

Further, the fixing device of the present invention can be of other applications. For example, the fixing device of the present invention can be attached to for example glass windows of a building to retain a rod that carries for example a flag. Or an article support rack can be formed by simply mounting a rod to the fixing device of the present invention that is attached to a wall surface.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENT

Figure 1:
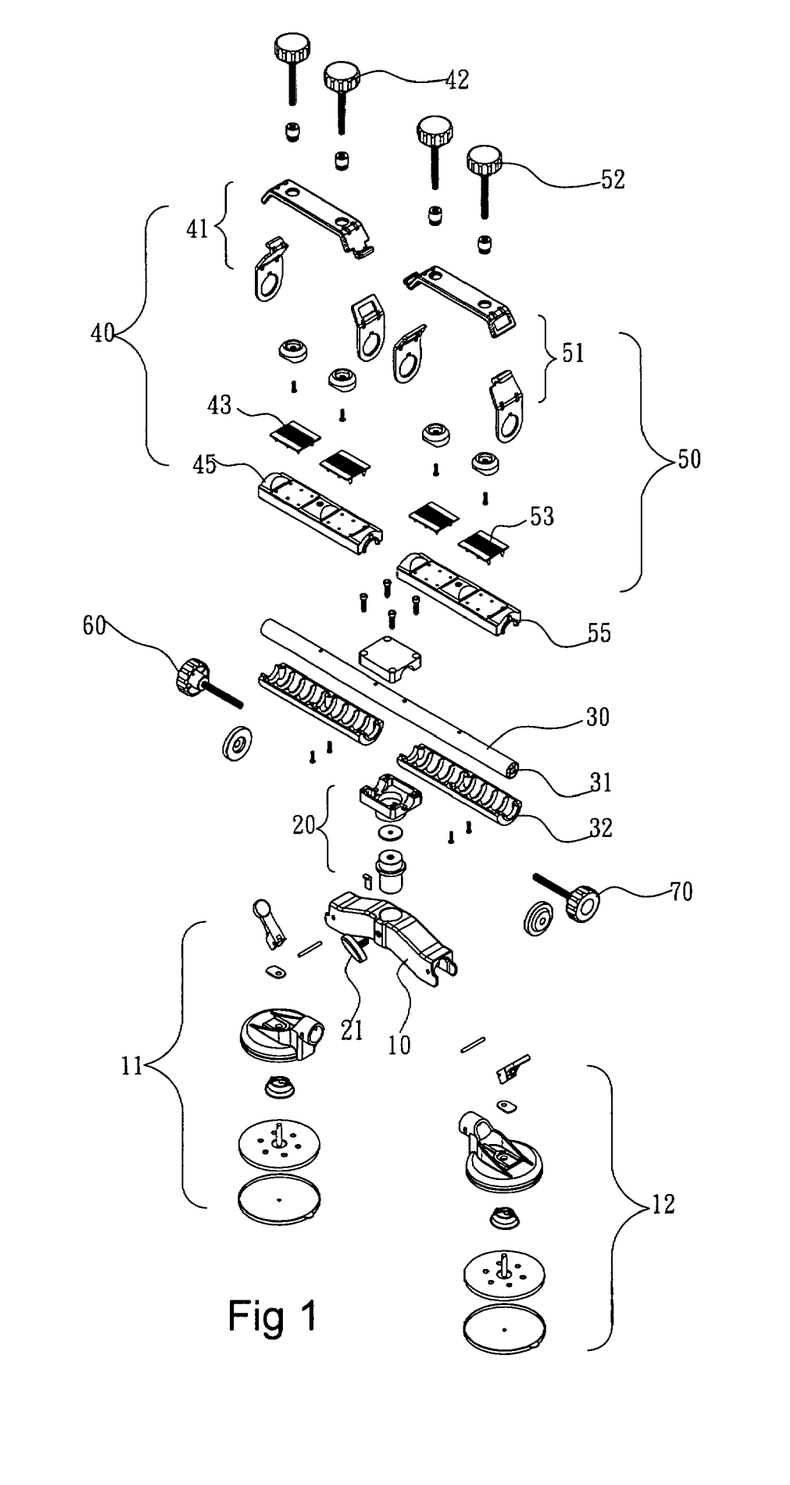
FIG. 1 is an exploded view of a fishing rod fixing device constructed in accordance with the present invention.
Figure 2:
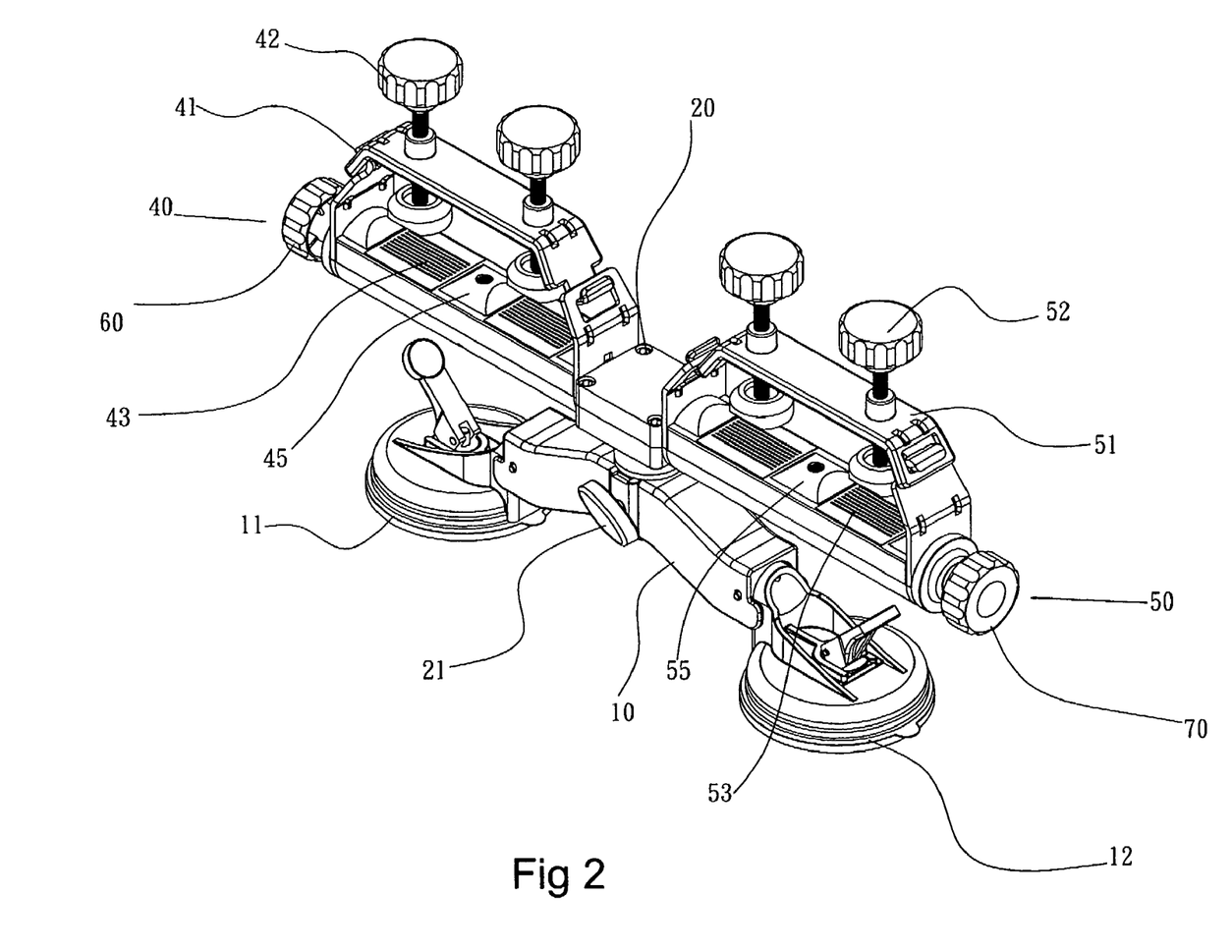
FIG. 2 is a perspective view of the fishing rod fixing device of the present invention.

With reference to the drawings and in particular to FIGS. 1 and 2, a device constructed in accordance is provided for fixing a fishing rod. The device comprises a base 10 that is made an elongated member with a central portion slightly upward bent to form a convex ridge. At opposite ends of the elongated member of the base 10, two suction cups 11, 12 are respectively provided.

A rotary seat 20 is arranged above the central ridge portion of the base 10 and has a shaft (not labeled) rotatably received in a bore (not labeled) defined in the central portion of the base 10 so as to rotatably mount the seat 20 to the base 10. An adjustment knob 21 is rotatably mounted to the base 10 and has an end portion (not labeled) laterally extending through a hole defined in a side wall of the elongated member of the base 10 and communicating the bore to releasably and selectively engage the shaft of the seat 20 for selectively locking the seat 20 at any desired orientation with respect to the base 10. In other words, the knob 21 can be released from the shaft of the seat 20 to allow free rotation of the seat 20 about the shaft thereof and positioned at a selected orientation. The knob 21 is then secured to lock the seat 20 at the selected orientation.

An elongate bar 30, which can be tubular, is mounted to the seat 20 so as to extend from the seat 20 in opposite directions. Preferably, the bar 30 is arranged in a symmetric manner with respect to the seat 20, but not necessary to be so. The bar 30 can be mounted to the seat 20 in any known means. For example and as illustrated, the seat 20 is provided with a top lid (not labeled) that is mounted to the seat 20 by means of for example bolts to interpose the bar 30 therebetween. Apparently, other means can be employed to realize the mounting of the bar 30 to the seat 20. Thus, the bar 30 is rotatable in unison with the seat 20.

Two retainers 40, 50 are provided on the bar 30 on the opposite sides of the seat 20 for releasably fixing fishing rods 90 (see FIGS. 2, 5, 6, in which only one fishing rod is shown) respectively. Each retainer 40, 50 has a base support 45, 55 positioned on the bar 30 and secured in position by a lower support member 32 that is arranged below the bar 30 at a location corresponding to the base support 45, 55. The base support 45, 55 and the respective lower support member 32 are secured together by any known means, such as bolts.

Each retainer 40, 50 also comprises wall members 41, 51, which are sized and mounted to the associated base support 45, 55 so as to form a passage between the wall members 41, 51 and the base support 45, 55 for the extension of the fishing rod 90. For example, the wall members 41 that are mounted to the base support 45 for the retainer 40 include two erected end pieces that are respectively and vertically mounted to opposite ends of the base support 45 (namely substantially perpendicular to the bar 30) and a cross piece that is fixed at opposite ends thereof to and extends between the end pieces and is spaced from the base support 45, whereby the passage is delimited by the cross piece and the base support 45 on upper and lower sides and the end pieces on opposite ends of the passage.

To ensure proper securing of the fishing rod 90 on the bar 30 or in the retainer 40, 50, one or more anti-skid pads 43, 53 are mounted on the base support 45, 55. The pads 43, 53 can be made of soft friction material, such as some plastics or rubber, that prevents skidding of the fishing rod 90 positioned thereon. The pads 43, 53 can be mounted to the base support 45, 55 in any known means and preferably, recesses (not labeled) are defined in the base support 45, 55 to receive and retain the pads 43, 53 therein. If desired, adhesive can be applied between the pads 43, 53 and the base support 45, 55.

The retainer 40, 50 also comprises one or more locking members 42, 52, corresponding to each anti-skidding pad 43, 53. In the embodiment illustrated, each retainer 40, 50 comprises two locking members 42, 52 spaced from each other. The locking member 42, 52 comprises a threaded bar extending through a hole defined in the cross piece of the wall members 41, 51 with a lower tip opposing the anti-skidding pad 43, 53. An internally-threaded collar is mounted to the hole of the cross piece to allow the extension of the threaded bar of the locking member in a threadingly engaging manner so that, due to the threading engagement between the threaded bar and the collar, rotation of the locking member 42, 52 with respect to the collar causes the lower tip of the locking member 42, 52 to approach or move away from the anti-skidding pad 43, 53.

Figure 3:
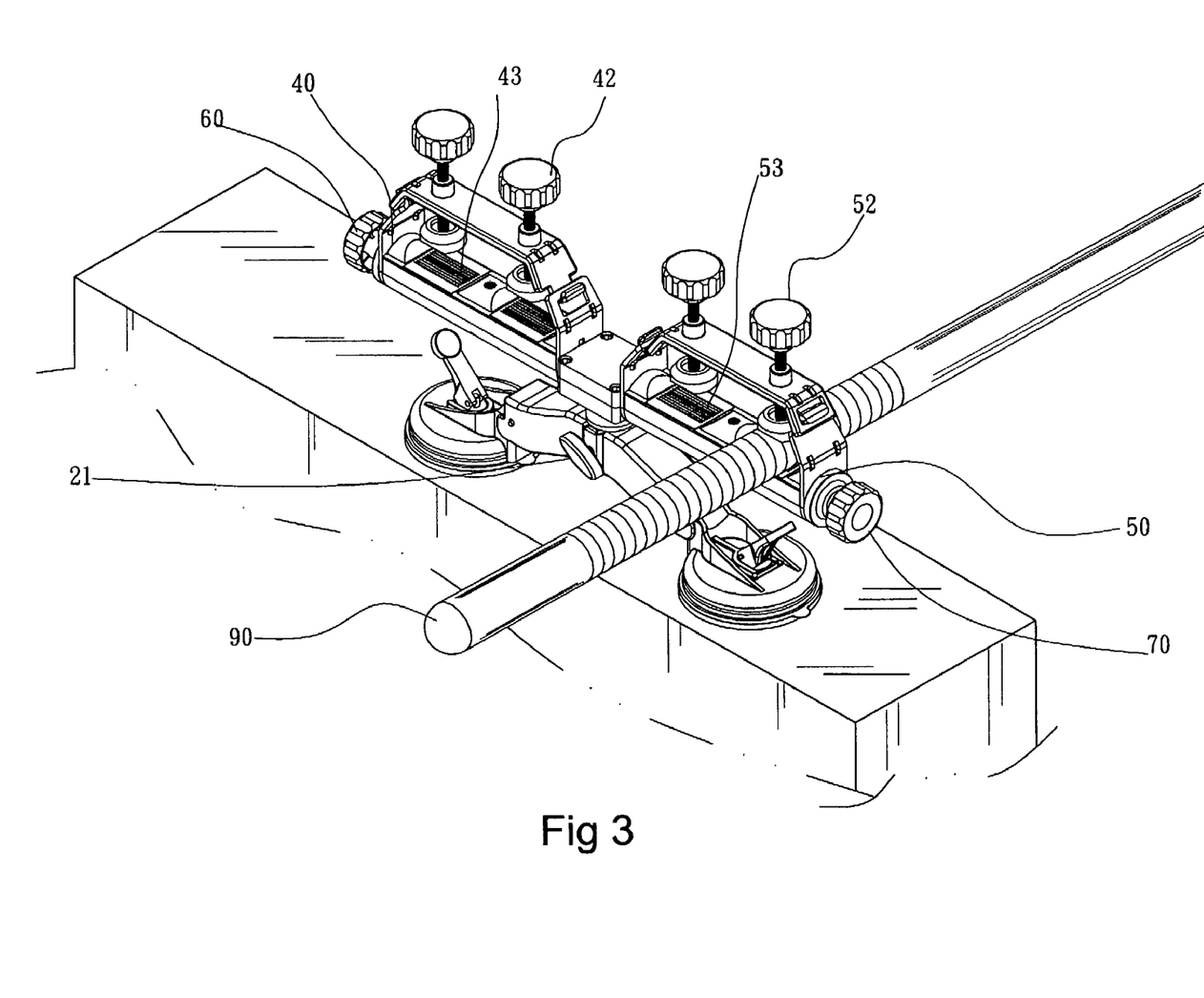
FIG. 3 is a perspective view illustrating the fishing rod fixing device retaining a fishing rod and attached to a smooth fixture surface.

The lower tip of the threaded bar of the locking member 42, 52 is provided with a rod engaging member that has a surface facing the anti-skidding pad 43, 53 and shaped corresponding to the outer configuration of the fishing rod 90 so that when the locking member 42, 52 is rotated to put the rod engaging member to engage the fishing rod 90 that is positioned on the anti-skidding pad 43, 53, the fishing rod 90 is tightly retained between the anti-skidding pad 43, 53 and the rod engaging member, as shown in FIG. 3. The rod engaging member can be provided with an anti-skidding surface layer or is made of an anti-skidding material to facilitate securing the fishing rod.

Preferably and as illustrated, a rotation knob is provided at a top end of the threaded bar of the locking member 42, 52 to facilitate manual rotation of the locking member 42, 52.

As shown in FIG. 3, the fishing rod fixing device of the present invention can be attached to any flat and smooth fixture surface by means of the suction cup 11, 12. By inserting a handle portion of the fishing rod 90 into the passage defined by the wall members 41, 51 and positioned on one of the anti-skidding pad 43, 53, and then rotating the locking member 42, 52 to secure the handle portion of the fishing rod 90, the fishing rod 90 is soundly fixed on the fixture surface. And the tip of the fishing rod 90 is positioned at a location away from the fishing rod fixing device and toward for example a lake for fishing.

Figure 4:
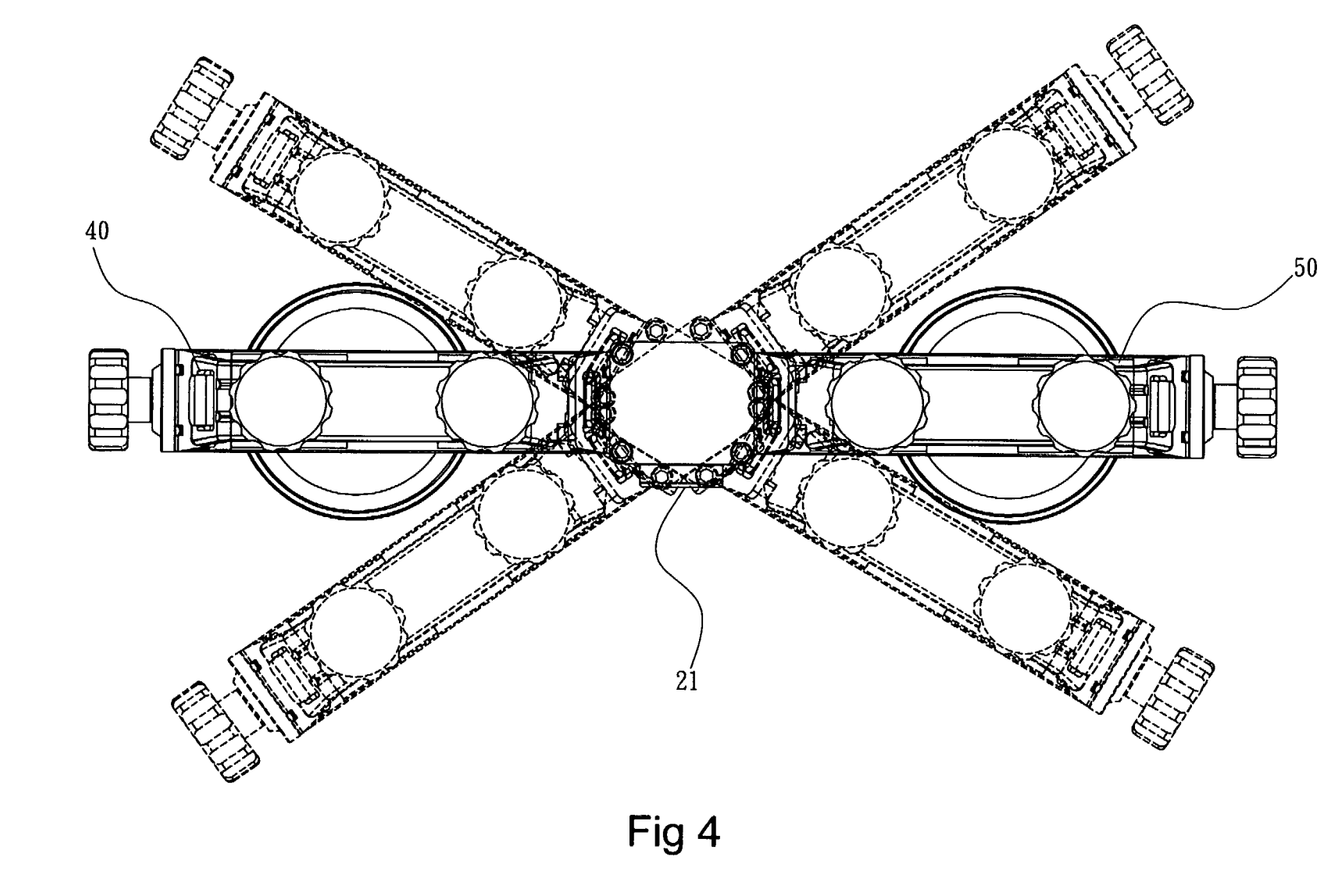
FIG. 4 is a plan view illustrating direction adjustment of the fishing rod fixing device of the present invention.

Also referring to FIG. 4, the horizontal direction of the fishing rod 90 can be adjusted by releasing the adjustment knob 21 to allow free rotation of the seat 20 with respect to the base 10 that is fixed to the fixture surface of the suction cups 11, 12. The seat 20 can be re-secured to the base 10 by tightening the adjustment knob 21 again.

Figure 5:
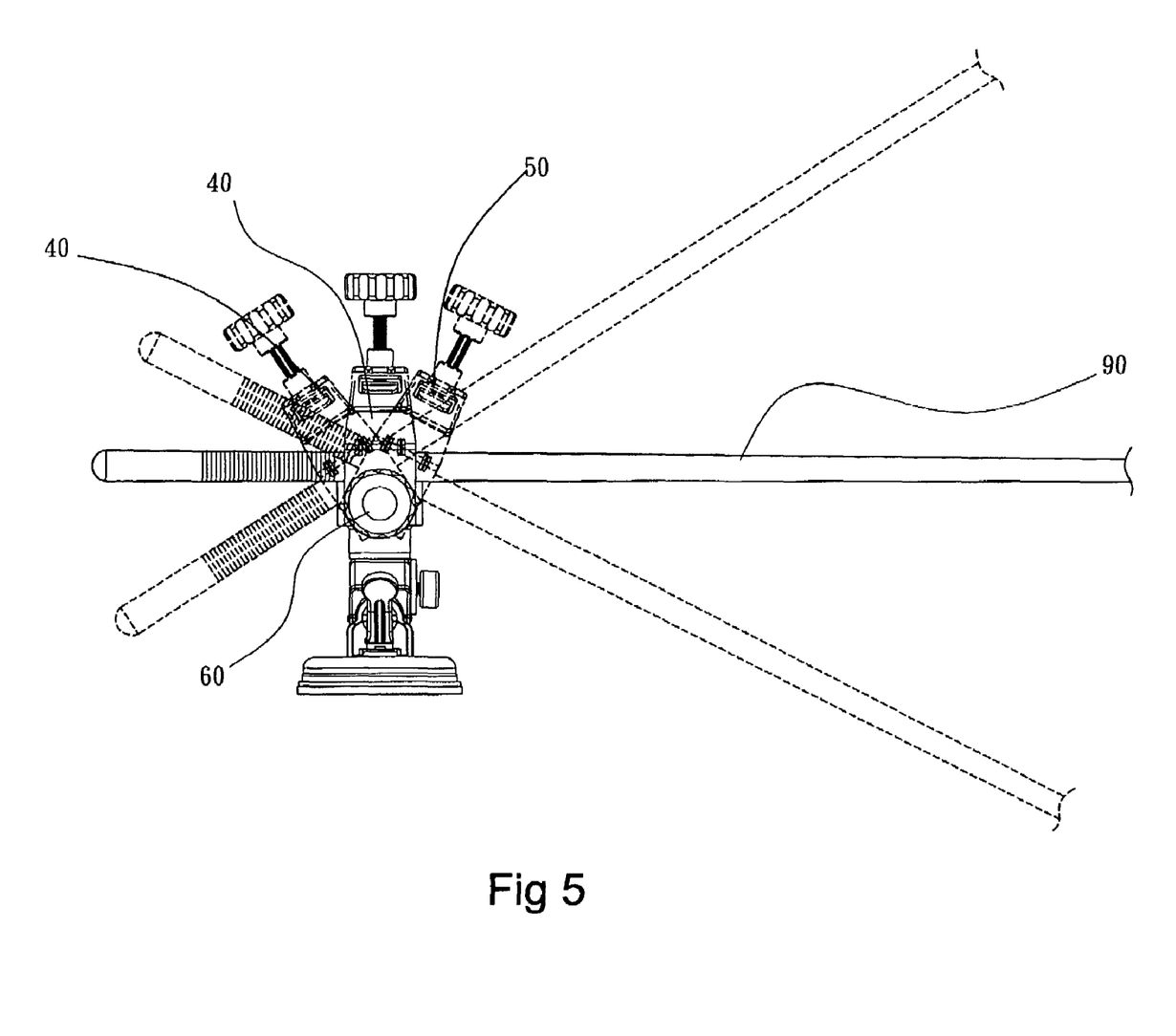
FIG. 5 is an end view illustrating inclination angle adjustment of the fishing rod fixing device of the present invention.

The base support 45, 55 and the lower support member 32 that are arranged above and below the bar 30 can be made with semi-circular recess to correspond in shape to a circular contour of the bar 30. This allows the base support 45, 55 and the lower support member 32 to rotate about the bar 30. This can be done by providing a suitable clearance between the bar 30 and the base support 45, 55 and the lower support member 32. Thus, the fishing rod 90 that is fixed to the retainer 40, 50 can be adjusted in the inclination angle, as illustrated in FIG. 5.

To secure the fishing rod 90 at any desired inclination angle, an angle locking member 60, 70 is provided. The angle locking member 60, 70 has a threaded bar received in and threadingly engaging an internally-threaded hole 31 defined in an end face of the tubular bar 30. The tubular bar 30 and the base support 45, 55 and the lower support member 32 are sized to have a locking pad that is interposed between a rotation knob of the angle locking member 60, 70 and the end of the tubular bar 30 apply a force to outer ends of the base support 45, 55 and the lower support member 32 when the angle locking member 60, 70 is tightened. In this respect, it is preferably that inner ends of the base support 45, 55 and the lower support member 32 is supported by for example the seat 20 and the lid of the seat 20. However, it is understood that this is illustrative and various ways for fixing the retainer 40, 50 at different inclination angle are apparent to those having ordinary skills.

Figure 6:
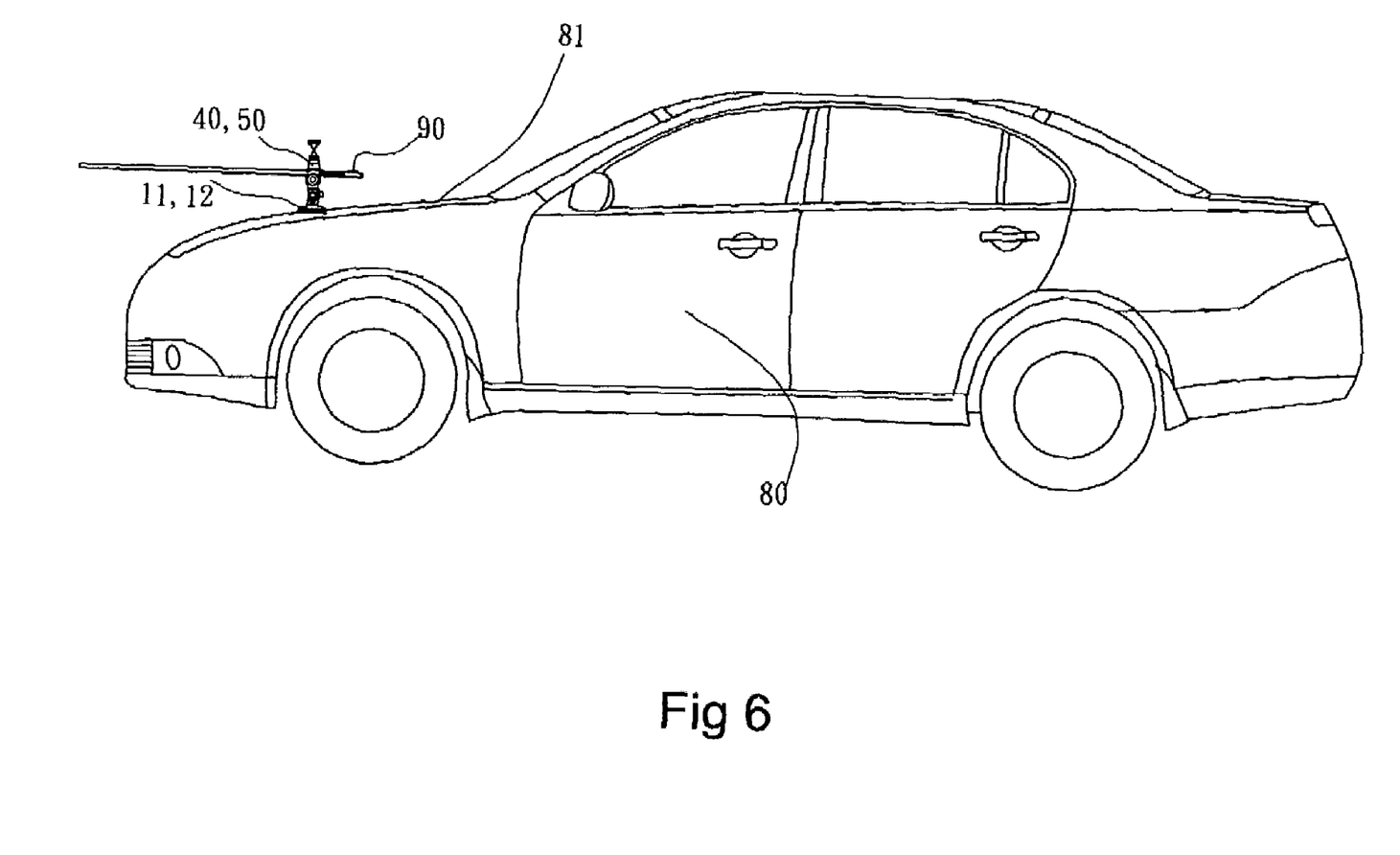
FIG. 6 is a side elevational view illustrating the fishing rod fixing device retaining a fishing rod and attached to a hood of a vehicle.

FIG. 6 illustrates another application of the fishing rod fixing device of the present invention, wherein the device is mounted to the engine hood 81 of a vehicle 80 by means of the suction cups 11, 12 and the fishing rod 90 is retained by the retainer 40, 50 to point to a desired direction and set at a desired inclination angle by the angle locking member 60, 70.

To this point, it is apparent that the present invention has at least the following advantages:

(1) The present invention provides a novel fishing rod fixing device, which has a simple structure comprising only a base, a rotary seat and fishing rod retainers rotatably mounted to the rotary seat and which allows for adjustment of direction and inclination angle by means of the rotation of the seat with respect to the base and the rotation of the retainers to the seat. In addition, the fishing rod fixing device can serve to fix a number of fishing rods at the same time to ensure operation efficiency for users.

(2) The present invention provides a fishing rod fixing device that can be efficiently attached to a smooth fixture surface by means of suction cups, while allowing for adjustment of horizontal direction and inclination angles of a fishing rod retained thereon with respect to the fixture surface.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A fishing rod fixing device, comprising:
   a base to which at least one suction cup is mounted, adapted to attach the base to a smooth fixture surface;
   a rotary seat rotatably mounted to the base by a shaft and releasably secured by an adjustment knob having a portion extending through the base to engage the shaft;
   a bar having a circular cross section and fixed to the seat with two end portions extending in opposite directions from the seat;
   two retainers respectively mounted to the two end portions of the bar in a manner that the retainers are rotatable about the circular cross section of the bar, each of the retainers comprising a base support movably mounted to the respective end portion of the bar and a wall member mounted to and spaced from the base support to form a passageway between the base support and the wall member to receive a portion of a fishing rod, at least one first locking member being coupled to the wall member of said each of the retainers to releasably secure the fishing rod to said each of the retainers, the at least one first locking member comprising a threaded bar extending through and engaging an internally-threaded hole formed in each of the wall members so that rotation of the first locking member in opposite directions moves a tip of the threaded bar of the at least one first locking member toward and away from the portion of the fishing rod to releasably secure the fishing rod to said each of the retainers, an anti-skidding pad being selectively mounted to each of the retainers to provide an anti-skidding engagement with the fishing rod; and
   a second locking member coupled to each of the two end portions of the bar to selectively and releasably secure each of the retainers at a rotational position with respect to the bar to set an inclination angle of each of the retainers, the second locking member having a threaded bar extending along a longitudinal axis thereof which is generally parallel to a longitudinal axis of the bar when coupled to each of the two end portions of the bar.

2. The fishing rod fixing device as claimed in claim 1, wherein the anti-skidding pad comprises a soft pad.

3. The fishing rod fixing device as claimed in claim 1, wherein each of the retainers comprises two first locking members each corresponding to one anti-skidding pad to retain one fishing rod.

4. The fishing rod fixing device as claimed in claim 1, wherein the tip of the threaded bar of the at least one first locking member comprises a rod engaging member that has a surface corresponding in shape to an outer configuration of the portion of the fishing rod.

5. The fishing rod fixing device as claimed in claim 1, wherein the wall member of said each of the retainers forms a hole, which receives therein a collar that forms the internally-threaded hole therethrough.

6. The fishing rod fixing device as claimed in claim 1, wherein the at least one first locking member comprises a rotation knob formed at an end of the threaded bar of the at least one first locking member opposite to the tip of the threaded bar of the at least one first locking member.

* * * * *